United States Patent [19]

Aoki et al.

[11] Patent Number: 4,860,378

[45] Date of Patent: Aug. 22, 1989

[54] TEXT FORMATTING APPARATUS

[75] Inventors: Toshihisa Aoki; Sotoji Watanabe, both of Tokyo, Japan

[73] Assignee: Hewlett-Packard Company, Palo Alto, Calif.

[21] Appl. No.: 67,565

[22] Filed: Jun. 26, 1987

[30] Foreign Application Priority Data

Jun. 27, 1986 [JP]  Japan ................................ 61-151300

[51] Int. Cl.⁴ ............................................. G06K 9/20
[52] U.S. Cl. .................................... 382/61; 364/200; 364/900
[58] Field of Search ........................................ 382/61

[56] References Cited

U.S. PATENT DOCUMENTS 4,345,245  8/1982  Vella et al. ............................ 382/45

OTHER PUBLICATIONS

Chapter 7 of "Software Tools" by Brian W. Kernigham and P. J. Plauger, published by Kyouritsu Shuppan Co. (in Japan). Published by Addison-Wesley Publishing Company in U.S., Copyright 1976. (pp. 219-250).

Primary Examiner—Theodore M. Blum
Attorney, Agent, or Firm—Donald N. Timbie

[57] ABSTRACT

In text formatting apparatus, means for inputting text, means for restricting formatting each line, means for storing characters to be used in the restriction formatting, and means responsive to a given command for changing the stored characters.

7 Claims, 1 Drawing Sheet

TEXT FORMATTING APPARATUS

BACKGROUND OF THE INVENTION

When preparing text in a Western language, it is widely known to print the text by formatting it in a desired style, such as conforming the text to the size of the sheet for printing, filling, and performing justification. The functions, operations and actual implementations of such a formatting program are well known to those skilled in the art, and a number of reference articles are available. Thus, further explanation for the formatter itself is omitted here. As one of the reference articles, consult Chapter 7 "Text Formatting" pp. 335-386 of Software Tools" (Authors: Brian W. Kernighan, P. J. Plauger, Translator: Izumi Kimura, published by Kyouritsu Shuppan Co.).

The formatting programs of the prior art were used only for formatting text in Western languages. In recent years, however, Japanese text processing has been regarded as important, and thus it has been desired for a formatting program to work well not only on Western text but also on text containing Kanji characters in the similar manner. Furthermore, it is desirable for the formatting program to output formatted text in non-Western language other than Japanese as well, including Chinese and Korean. In implementing a multi-language supporting text formatting apparatus, new problems have arisen.

Among them is a problem relating to format restriction processing. Format restriction processing, as is well known, operates so that particular characters are not placed at the beginning or end of a line of text. For example, when the punctuation mark "." comes at the beginning of a line, it will be prevented from appearing at the beginning of that line by placing characters from the end of the previous line ahead of it.

In the formatting programs of the prior art for Japanese text processing, the sets of the characters forbidden to be placed at the beginning of a line or at the end of a line were fixed, and their character codes were buried in its program codes. Thus, it was impossible for the user to modify these character sets later. When it was required to use such programs not only for Japanese but also for Chinese, Korean and so on, however, a new problem would arise regarding format restriction processing. That is, the character sets to which the format restriction processing is applied are different among these languages. Even if there were a common character thereto, its character code representation might be different. Furthermore, even in one language, the characters that are to be format-restricted may be different among individual persons. The prior text formatting apparatus could not deal with such a situation.

Accordingly, one object of the present is to solve the problem of the prior art described above and to handle the differences in format restriction processing among languages as well as among individual persons.

BRIEF SUMMARY OF THE INVENTION

According to the text formatting apparatus of one embodiment of the present invention, it is possible for the user to change the character sets to which the format restriction processing are to be applied as required. In one embodiment the user is allowed to provide such character sets as the parameters of a command buried in text for starting the filling operation.

BRIEF DESCRIPTION OF THE DRAWING

The drawing is a block diagram of a system using the invention.

DETAILED DESCRIPTION OF THE INVENTION

Figure 1:
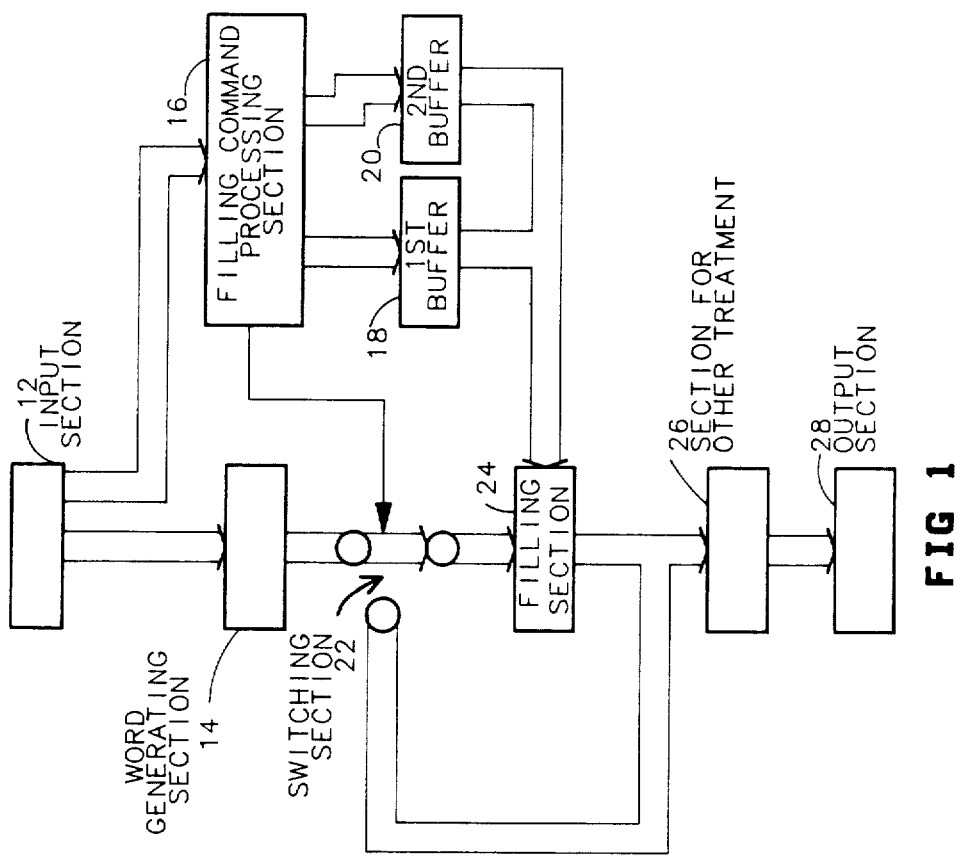

The drawing shows a functional block diagram of one embodiment of the text formating apparatus constructed in accordance with the present invention. In the FIGURE, the text to be formatted is read in via an input section 12. In the text are buried commands for controlling the formatting operations of the text formatting apparatus, as well as the text body to be formatted. In this embodiment, there are among these commands, a command for initiating the filling operation. This command can optionally have the paramenters to provide the sets of characters which should not be placed at the beginning of a line, hereinafter referred to as prefix restriction character set, and to provide the set of characters which should not be placed at the end of a line, hereinafter referred to as suffix restriction character set, as shown below:

.fi p'(['s'o . . )]'

The above example instructs the perform filling operation upon the portion of the text below this command. In addition, it also provides as the suffix restriction character set those characters between the pair of apostrophes following p i.e., (and, and as the prefix restriction characters those between the pair of apostrophes following s i.e., o . , ) and ].

When the input section 12 detects this command, it is forwarded to a filling command processing section 16 for analysis. The filling command processing section 16 then controls a switching section 22 to cause the output of the word generating section 14 to pass through the filling section 24. The filling command processing section 16 further extracts the suffix restriction character set and prefix restriction character set from the filling command given and stores them in a first buffer 18 and a second buffer 20 respectively. When one of the suffix or prefix character sets or either of them is not specified in this command, the contents of the corresponding buffer is not rewritten. Thus, if the filling operation mode is disabled, i.e., the apparatus is made to operate in a nonformatting mode in which the test given to the input section 12 will be output from the output section 28 with the same appearance as the original text without any filling operation being performed on it and then restarted responsive to an .fi command which does not have the parameters described above, the same format restriction processing will be performed as before.

On the other hand, when input section 12 receives any object other than the commands i.e., when it receives the body of text, it is fowarded to the word generating section 14. This section breaks the given text into words and sends them one by one to a filling section 24. When this section is provided with text in an non-Western language such as in Japanese, it breaks it into characters such as Kanji or kana character, treating them as if they were words of a Western language. With this treatment, the present text formatting apparatus can handle both Western and non-Western text uniformly. Because the remaining portion of this specification soley decribes the processing on non-Western text, explanation will be done with the assumption that word generating section 14 outputs characters one by one. As a matter of course, the filling section 24 explained below can work on any text that includes Western sentences with no problem, since a 'character' of non-Western text is treated as 'word' of Western text.

The filling section 24 receives a sequence of characters from the word generating section 14 and adds them character by character to the end of the line currently being built up. When it is detected that the end of this line has run beyond the right margin, filling section 24 moves the character added last over to the next line as its beginning character.

At this point, the character positioned at the end of the current line and one at the beginning of the next line are respectively compared with the contents of the suffix and prefix restriction character sets. If no coincidence is detected during these comparisons, then the current line will be settled as it is. If at least one of these comparisons shows coincidence, then the last character of the current line will be expelled out to the beginning of the next line. After this, the comparisons above are performed again, and, if necessary, the expelling of the last characters will be repeated.

The filling section 24 then justifies the current line just settled so that the last character of the current line aligns with the right margin. As is well-known, it may be done by performing proportional spacing printing, or by inserting one or more spaces at appropriate places in the line.

The filling section 24 finally passes the current line prepared as above to a section 26 for other treatment. This line will be printed by an output section 28 after receiving any required treatment there.

The present invention is not limited to the embodiment explained above, and may, of course, be widely modified in accordance with necessity. For example, a plurality of buffers for storing the suffix or prefix restriction character set may be provided to allow selection among them. The internal operation of filling section 24 may be different from the explanation given above. Furthermore, the output device is not limited to a printer as a display device may be used. It is also possible to choose the spacing after a period or question mark between a single space character or two since this spacing scheme is different among countries.

As explained above, because the user can freely set and change the restriction character sets in accordance with the present invention, it is possible to provide text formatting apparatus that is capable of accommodating itself to the difference in format restrictions of various languages.

We claim:

1. Apparatus for formatting a flow of text with justified margins, comprising:
    means for storing characters in the text that are designated therein as being characters that are not to appear at a line extremity,
    means for building a formatted line of characters in accordance with said text,
    means for comparing a character at an extremity of said formatted line with at least some of the stored characters, and
    means for replacing a character at said extremity of said line with a character other than a stored character if the character at the extremity of the line is one of the stored characters.

2. Apparatus for formatting text with justified margins comprising:
    first means responsive to said text for storing suffixes whch are characters to be prevented from appearing at the ends of lines of justified text,
    second means for building a formatted line of characters in accordance with said text, and
    third means for comparing the last character of said formatted line with the stored characters that are to be prevented from being at the end of a line and for placing that character at the beginning of the next line if it is one of the stored characters.

3. The apparatus as set forth in claim 2, wherein said first means is further responsive to said text for storing characters to be prevented from appearing at the beginning of lines of justified text, and
    fourth means for comparing the character at the beginning of said next line with the stored characters that are to be prevented from being at the beginning of a line and for replacing a character at the beginning of said next line if it is one of the stored characters with a character from the previous line.

4. The apparatus as set forth in claim 2 wherein the suffixes and prefixes are identical by a command buried in the text to be formatted.

5. The apparatus as set forth in claim 3 wherein the suffixes and prefixes are identified by a command buried in the text to be formatted.

6. Apparatus for formatting text with justified margins having filling means for inputting the text and means for performing restriction processing wherein there is an improvement comprising: means for storing a character set which is to be used by said means for restriction processing, and means for changing the character set in said means for storing.

7. A method for providing formatted text comprising:
    supplying text to be formatted,
    storing characters indicated by said text as those that are not to appear at line extremities,
    changing said stored characters as required, and
    performiing format restriction processing utilizing the stored characters.

* * * * *